United States Patent [19]

Housman

[11] 3,948,416
[45] Apr. 6, 1976

[54] VENDING MACHINE

[76] Inventor: Richard W. Housman, 3416 Manning Ave., Los Angeles, Calif. 90064

[22] Filed: Feb. 18, 1975

[21] Appl. No.: 550,318

[52] U.S. Cl. .................. 221/121; 221/266; 221/123
[51] Int. Cl.² .......................................... B65G 59/00
[58] Field of Search ............. 221/82, 119, 121, 122, 221/266, 310, 237, 89, 86, 123, 132, 113

[56] References Cited
UNITED STATES PATENTS

| | | | |
|---|---|---|---|
| 1,680,024 | 8/1928 | Koerner | 221/123 X |
| 1,716,883 | 6/1929 | Gesbeck | 221/266 X |
| 2,245,371 | 6/1941 | Van Tuyl | 221/121 |
| 3,036,732 | 5/1962 | Schaef | 221/113 |

Primary Examiner—Allen N. Knowles
Attorney, Agent, or Firm—Nilsson, Robbins, Dalgarn & Berliner

[57] ABSTRACT

A vending machine comprising an upright circular array of storage bins formed by an annular wall and by partitions extending from a hub which is horizontally journaled for rotation within the wall. A merchandise selector is vertically aligned with the bottommost bin through an opening in the wall and is adapted to receive a single item of merchandise from a plurality of loosely disposed items. The annular wall includes a spring-loaded, slidably overlapping portion which serves as a jam release. Ramp surfaces are provided on the partitions or on opposing edges of the wall opening to divert merchandise to the gravitational center of the bottommost bin.

7 Claims, 8 Drawing Figures

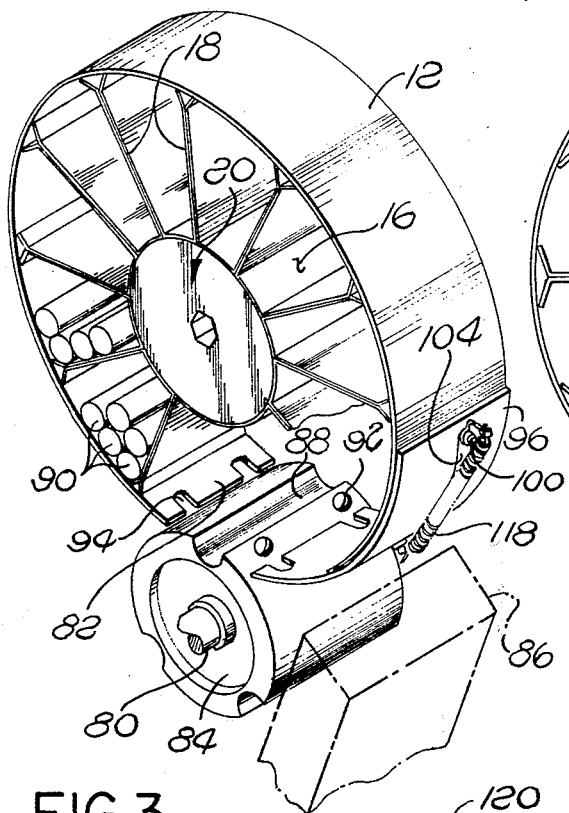
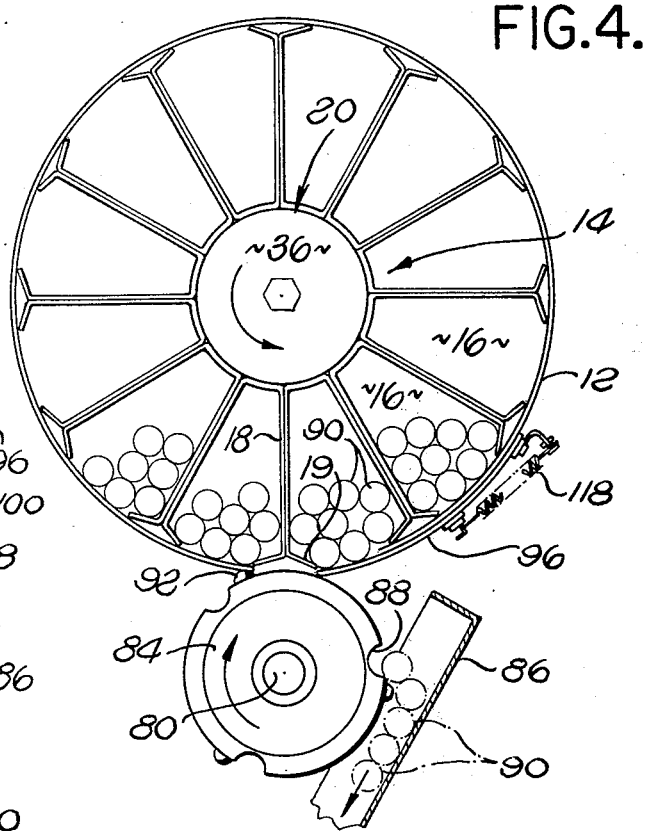
FIG. 4.
FIG. 3.
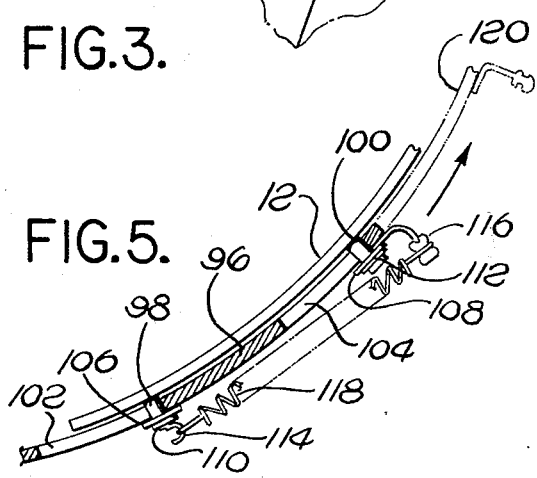
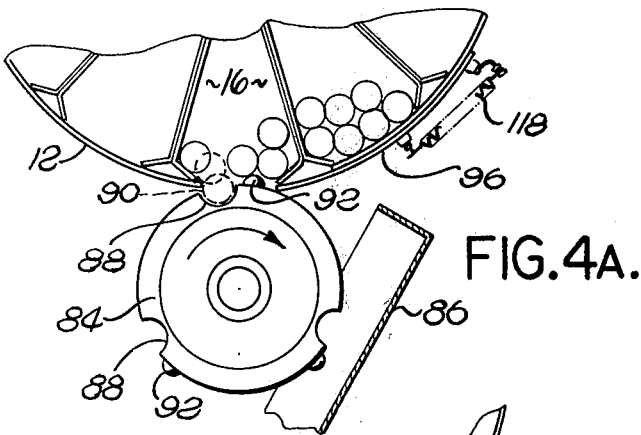
FIG. 5.
FIG. 4A.
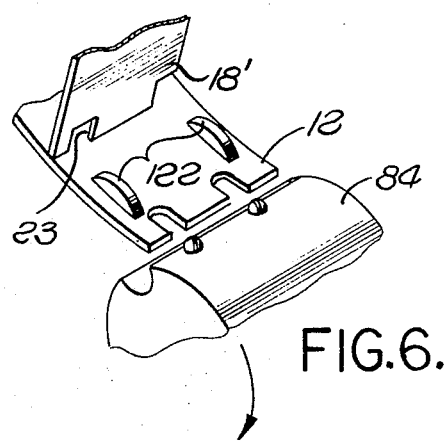
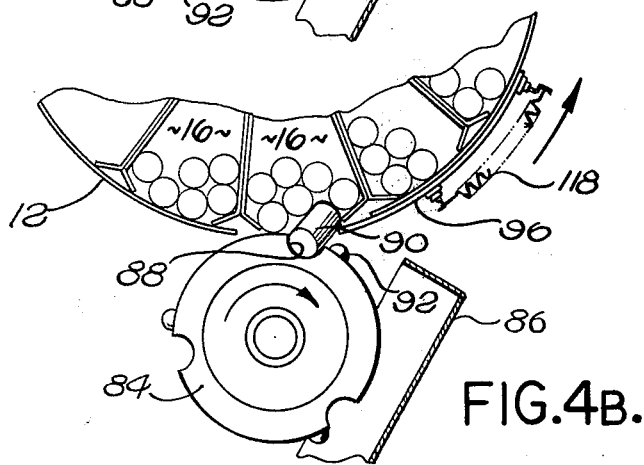
FIG. 6.
FIG. 4B.

VENDING MACHINE

FIELD OF THE INVENTION

The field of art to which the invention pertains includes the field of merchandise vending machines, particularly coin-operated machines wherein items of merchandise are stored for selective-type vending.

BACKGROUND AND SUMMARY OF THE INVENTION

In the vending by machine of certain types of merchandise, it is often desirable to store different units of merchandise in bulk, yet permit a selection therefrom. An example which is particularly pertinent to the present invention is the strong and vending of astrological reports or horoscopes in the form of cylinders of spirally wound sheets. A separate and distinctive report is provided for each of the twelve astrological signs, but all of the reports have identical shape. Other examples include similarly packaged lipsticks of different shades or colors, or other sundry goods in generally similar containers. In each case, it is necessary to store a quantity of such goods, provide means for viewing the goods aand means for selecting one type over another, all with a mechanism of sufficient security, reliability, ease of loading and use, compactness and low cost to permit coin vending therefrom to be commercially attractive and to permit its distribution to retailers of all types where floor and counter space is at a premium.

The present invention satisfies the foregoing needs by providing a vending machine with a plurality of storage bins, wherein a bin can be selected as desired, but wherein the items of merchandise in each bin are randomly selected. The vending machine includes an upright circular array of bins in which items of merchandise are stored in bulk with different items in different bins. By providing for upright storage, all of the bins can be readily loaded in one operation and thereafter can be simultaneously viewed so that a full range of the available selection can be seen. The present construction provides bins with large storage capacity in a minimum space, permitting the machines to be located on counter tops to facilitate point of purchase sales.

In particular, the circular array of bins is formed by provision in a housing of an annular wall which, for the most part, is stationary, and by partitions extending from a hub which is horizontally journaled for rotation within the annular wall. A coin-operated merchandise selector is vertically aligned with the bottommost bin through an opening in the wall and is adapted to receive a single item of merchandise from a plurality of loosely disposed items. The circular wall includes a spring-loaded, slidably overlapping portion which serves as a jam release. Ramp surfaces are provided on the partitions, or on the opposing edges of the wall opening, to direct merchandise to the gravitational center of the bottommost bin. The result is a secure, reliable, compact vending machine which is economical to manufacture and easy to load and use.

References of interest include U.S. Pat. Nos. 3,036,732, 2,189,141, 801,079, 1,558,398, 2,479,860 and 3,539,073.

BRIEF DESCRIPTION OF THE DRAWINGS

FIG. 3 is a perspective view of a bin and selector utilized in the vending machine of FIG. 2;

FIG. 4 is an elevational view of the bin and selector of FIG. 3, illustrating operation thereof;

FIGS. 4a and 4b are elevational views of portions of the bin, and of the selector of FIG. 3, illustrating further operation thereof;

FIG. 5 is a detail, cross-sectional view of a jam release mechanism used herein; and FIG. 6 is a perspective view of a portion of a bin and selector illustrating an alternative agitation mechanism.

DETAILED DESCRIPTION

Figures 1, 2:
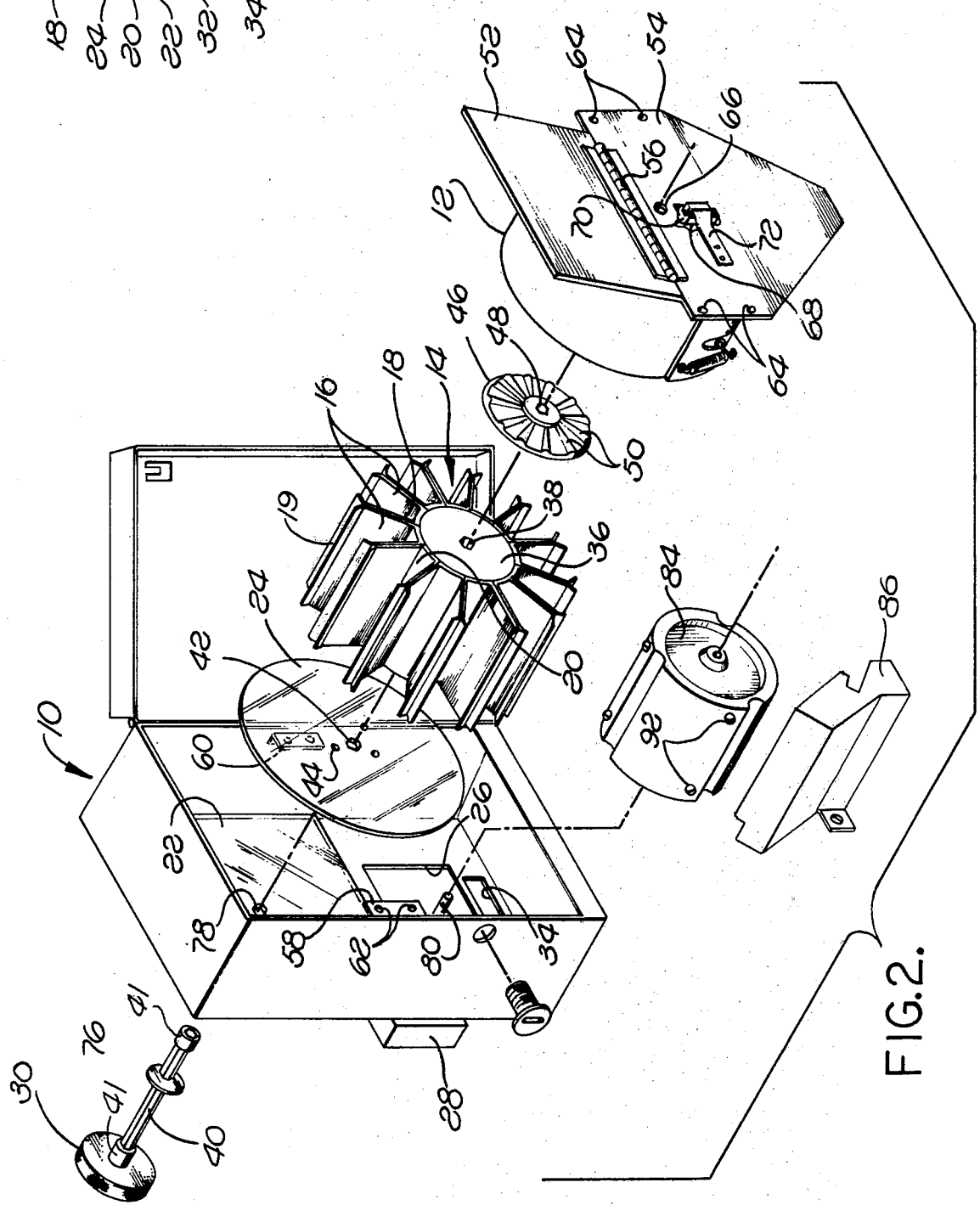
FIG. 1 is an elevational view of a vending machine in accordance with the present invention.
FIG. 2 is an exploded perspective view of the vending machine of FIG. 1.

Referring to FIGS. 1 and 2, the vending machine includes a substantially rectangular box-like housing 10 which encloses an upright annular wall 12 within which a merchandise storage member 14 is rotatably journaled. The storage member 14 includes a plurality of bins 16 formed by partitions 18 radially extending from a horizontally journaled hub 20 to the vicinity of the annular wall 12. The bins 16 are visible through a rectangular transparent panel 22 carried in a front opening therefor in the housing 10 and through a circular decorated panel 24 (decoration not shown) which is secured to the hub 20 for rotation with the storage member.

The number of partitions to be employed will, of course, depend on the variation of items to vended. Similarly, the circular panel 24 will contain identifying indicia appropriate to the merchandise. For example, with astrological reports, twelve partitions 18 are provided to form twelve bins 16, one for each astrological sign, and the circular panel can be decorated with such signs. With the merchandising of other items, for example, lipstick, the number of bins will depend upon the number of variations of color available, or other criteria of choice. However, to obtain the advantages of the present construction, the number of bins should generally be at least six and less than 20. In general, the larger width dimension of the bins, i.e., the distance between the partitions at the peripheries thereof, should be at least twice the width of the item to be vended.

The lower front region of the housing 10 is formed with an opening 26 through which is disposed a coin controlled mechanism enclosed in a substantially square, forwardly protruding box-like offset 28. The coin controlled mechanism is of conventional construction and includes a manually operable handle 30 which, upon insertion of a coin of proper denomination in a receptacle slot 32, can be turned to actuate the vending mechanism, to be described, resulting in dispensing of an item of merchandise from a selected bin 16 to a delivery slot 34.

Referring more particularly to FIG. 2, the storage member hub 20 is hollow but formed with solid ends 36 through which aligned openings, such as 38, are formed for protrusion therethrough of a hexagonal rod 40 terminating in a Teflon bushing 41. The circular panel 24 is formed with a central opening 42 through which the rod 40 extends and is additionally formed with a plurality of openings 44 through which the circular panel is bolted (by bolts not shown) to the front of the hub 20 through corresponding openings therein (not shown) so that the circular panel is rigidly fixed to the hub 20 to rotate therewith. A circular index detent 46 is formed with a central hexagonal opening 48 for the rod 40 and is welded to the rear hub end 36. The index detent 46 is formed with a plurality of uniformly spaced protuberances 50, corresponding to the partitions 18 and is welded to the hub 20 with the protuberances 50 in radial alignment with the partitions 18.

The top rear edge of the annular wall 12 is spot welded to a back stop 52 and a loading door 54 is pivotally connected to the bottom of the back stop 52 by a piano hinge 56. The housing 10 includes a pair of brackets 58 and 60 on opposite sides thereof and the brackets 58 and 60 and edges of the loading door 54 are formed with aligned openings 62 and 64, respectively, through which screws (not shown) are threaded to secure the loading door in the housing, thereby rigidly securing the annular wall 12. The loading door is formed with an opening 66 medially between its sides in alignment with the index detent opening 48 and through which the rod 40 bushing 41 extends. Additionally, the loading door is formed with a rectangular opening 68 below the bushing opening 66 through which protrudes a roller 70 rotatably journaled between ends of a band spring 72 secured to the rear surface of the loading door 54. The roller 70 is thus spring-loaded against the detent plate 46 between the protuberances 50 to provide sufficient resistance for index rotation of the storage member 14.

In assembly, the handle 30 is threaded onto the front end of the rod 40 and the rod 40 is disposed through the hexagonal hole of a washer 76 on the front side of the front panel 22, through a central opening 78 in the front panel 22, through the openings 42, 38, 48 and 56 in the circular panel 24, storage member hub 20, detent plate 46 and loading door 54, respectively. The bushing 21 rotatably rides in the opening 66 to secure the components together. Thereafter, the loading door can be screwed to the brackets 62. To load the storage member 14, the bushing can be withdrawn, the rod 40 and handle 30 pulled outwardly to withdraw the end of the rod from the loading door 54. The screws holding the loading door 54 to the brackets 60 and 62 are then removed and the loading door can be simply lifted up for items of merchandise to be placed in the bins 16.

As above-indicated, the coin controlled mechanism is of conventional construction and includes a shaft 80 which extends rearwardly beneath the storage member 14. Referring additionally to FIG. 3, the annular wall 12 defines an opening 82 at the bottom thereof, which opening is wider than the widths of several of the items of merchandise to be vended, but smaller than the bin 16 width thereat. A selector cylinder 84 is journaled to the coin mechanism shaft 80 and secured thereto (by means not shown) for rotation therewith in vertical alignment with the storage member 14 through the wall opening 82. A chute 86 is disposed laterally adjacent the selector 84 to receive items of merchandise delivered by the selector 84 and itself delivering the items of merchandise to the delivery slot 34. For this purpose, the selector cylinder 84 is formed with a plurality of elongate recesses 88 spaced circumferentially therearound and extending from one edge of the cylinder 84 to the other. The width of each recess is larger than the width of the item of merchandise (e.g., the scroll cylinders 90) but narrower than the combined width of two of such items, so that only one item can be receved therein. Any reasonable number of such recesses may be formed in the cylinder which, depending upon the mechanism of rotation, may have any reasonable number of recesses from one to more than three. Additionally, the cylinder 84 is formed with a pair of protuberances in the form of projecting screwheads 92 on its outer surface leading each recess. The screwheads protrude through the wall opening 82, as will be described, to agitate items of merchandise in the bottommost bin. The edges of the annular wall 12 on opposite sides of the opening 82 are formed with slots 94 to permit passage thereby of the screwheads 92.

In cross-section parallel to the front panel, each bin 16 is in the shape of a truncated triangle. The partitions 18 are formed in pairs from sheet metal having a generally uniform thickness and bent into a somewhat U-shaped wherein the base of the U is arched to conform to the rounded surface of the hub 20 to which it is spot welded. Additionally, the material adjacent the outer edges of the partitions 18 are bent somewhat more than 45° but less than 90° to form a slope 19 thereat to form a structure, with an adjacent bin partition 18, of generally Y-shape, in cross section. The result is that the internal peripheral surfaces 19 of the partitions 18 are sloped toward each other and serve as ramps for directing any loosely contained item of merchandise thereon toward the gravitational center of each bin 16.

Referring additionally to FIG. 5, the annular wall includes a lower, separate portion 96 which is arranged for slidable movement along the major portion of the wall 12 to provide a jam release mechanism. A pair of studs 98 and 100 are carried by the lower end of the annular wall 12 aligned and spaced one from another therealong and projecting outwardly from the wall 12. The separable wall portion 96 is carried on the studs 98 and 100 via slotted openings 102 and 104 therethrough and is retained by wider washers 106 and 108 which in turn are threadably secured by bolt heads 110 and 112, respectively, threaded into studs 98 and 100, respectively. Catch members in the form of hooks 114 and 116 are welded to the lower bolt head 106 and to the top edge of the separable lower wall member 96, and a coil spring 118 is secured therebetween to spring-load the movable wall portion 96 to a downward closed position. When pressure is exerted against the lower edge of the movable wall portion 96, it slides along the studs 98 and 100 to the position shown in shadow at 120.

The manner of operation of the vending machine can be seen with reference to FIGS. 4, 4a and 4b. In FIG. 4, the disposition of the selector cylinder 84 is shown after the selection has been made and the cylinder rotated about 60°. The item of merchandise 90 tumbles from the recess 88, as shown by the shadow representation, into the chute and from there it falls into the delivery slot 34. FIG. 4 also shows the storage member rotated with the partitions between selections, i.e., wherein the circular index detent 46 is between stop positions.

In FIG. 4a, the storage member 14 has been rotated until the desired bin 16 is disposed in the lowermost position. After insertion of a coin, the selector cylinder 84 is rotated and it can be seen that the screwheads 92 serve to agitate the items of merchandise to break up nesting or stacking. Thereafter, during the course of rotation, the recess 88 is disposed in vertical alignment with the opening through the wall 12 for reception therein of a single item of merchandise. It can be seen that movement of items of merchandise 90 toward the center of the bin 16 is aided by the ramps formed by the angled outer edge of the partition 18 and bent angle iron 19.

Referring to FIG. 4b, there is illustrated the occassional mishap whereby an item of merchandise 90 is caught by the selector cylinder recess 88 but fails to fall entirely therewithin as a result of being entangled with other items of merchandise. Such a mishap could occur if the vending machine is jostled or shaken during movement sufficiently to jumble the items of merchandise within the bins. The result is a jamming of the item of merchandise 90 between the trailing edge of the recess 88 and lower edge of the movable wall portion 96. However, as a result of the jam-release mechanism, the movable wall portion 96 moves upwardly, thereby expanding the opening and permitting the selector cylinder 84 to carry the item of merchandise 90 out of the bin for deliverance into the chute 86. Note that the storage member 14 can be rotated during jam release against the relatively light force of the index spring 72.

In the structure depicted in FIGS. 2–4, directing ramps have been described as provided by the opposing slope peripheral surfaces of the partitions 18 and angle irons 19. Referring to FIG. 6, an alternative embodiment is illustrated wherein ramps are provided by means of protuberances 122 on the inner surfaces of the annular wall 12 and movable portion 96 thereof (not shown) adjacent, and on opposite sides of, the bottom opening. The protuberances are sloped toward the opening and replace the sloped peripheral portions of the partitions and angle irons for directing items of merchandise to the gravitational center of the bottommost bin. In this case, the partitions 18' are formed with straight sweeping peripheral edges and may be formed with relieved portions, such as the cut-away portions 21 and slots 23 to clear the protuberances during rotation of the storage member. Alternatively, the width of each partition 18' can be limited to the distance between the protuberances 122. It will be appreciated that the embodiment of FIG. 6 provides some savings in construction costs as it avoids the formation of bends in the outer periphery of each partition 18 and avoids the provision of an angle iron 19 and welding operations therefor.

I claim:

1. A vending machine, comprising:
a housing;
a merchandise storage member for rotation in said housing on a horizontal axis, comprising a hub and a plurality of partitions radially extending from said hub;
an annular wall around the outer periphery of said partitions defining therewith a plurality of storage bins for containing items of merchandise, and defining an opening for the bottommost of said bins; and
means for dispensing merchandise from said bottommost bin, comprising a selector member having an outer surface formed with a recess of predetermined width and adapted for reception of a single one of said items of merchandise, said member being rotatably mounted for vertical alignment of said recess with said annular wall opening;
said partitions being spaced sufficiently one from the other to contain a plurality of said items of merchandise loosely disposed side-by-side therebetween, the distances between adjacent ones of said partitions at the peripheries thereof being each at least twice said predetermined recess width.

2. A vending machine, comprising:
a housing;
a merchandise storage member mounted for rotation in said housing on a horizontal axis, comprising a hub and a plurality of partitions radially extending from said hub;
an annular wall around the outer periphery of said partitions defining therewith a plurality of storage bins for containing items of merchandise, and defining an opening for the bottommost of said bins; and
means for dispensing merchandise from said bottommost bin, comprising a selector member having an outer surface formed with a recess of predetermined width and adapted for reception of a single one of said items of merchandise, said member being rotatably mounted for vertical alignment of said recess with said annular wall opening;
said annular wall comprising a movable lower portion adjacent one side of said opening, and release means for moving said lower portion, to enlarge said opening in response to jamming of said selector member against an item of merchandise, and thereafter returning said portion;
said partitions being spaced sufficiently one from the other to contain a plurality of said items of merchandise loosely disposed side-by-side therebetween.

3. The vending machine of claim 2 wherein said release means comprises means for mounting said lower wall portion to, in part, overlap an adjacent upper portion of said wall to slide thereagainst and means for spring loading said lower wall portion to a return position.

4. The vending machine of claim 3 wherein said mounting means comprises a projection carried by said upper wall portion through an opening therefor extending lengthwise through said lower wall portion and said spring loading means comprises a spring connected to said projection and to said lower wall portion.

5. A vending machine, comprising:
a housing;
a merchandise storage member mounted for rotation in said housing on a horizontal axis, comprising a hub and a plurality of partitions radially extending from said hub;
an annular wall around the outer periphery of said partitions defining therewith a plurality of storage bins for containing items of merchandise, and defining an opening for the bottommost of said bins; and
means for dispensing merchandise from said bottommost bin, comprising a selector member having an outer surface formed with a recess of predetermined width and adapted for reception of a single one of said items of merchandise, said member being rotatably mounted for vertical alignment of said recess with said annular wall opening;
said partitions being spaced sufficiently one from the other to contain a plurality of said items of merchandise loosely disposed side-by-side therebetween, the peripheral surfaces of said partitions being sloped toward each other to serve as ramps for directing any loosely contained item of merchandise thereon toward the gravitational center of said bin.

6. A vending machine, comprising:
a housing;
a merchandise storage member mounted for rotation in said housing on a horizontal axis, comprising a hub and a plurality of partitions radially extending from said hub;

an annular wall around the outer periphery of said partitions defining therewith a plurality of storage bins for containing items of merchandise, and defining an opening for the bottommost of said bins;

means for dispensing merchandise from said bottommost bin, comprising a selector member having an outer surface formed with a recess of predetermined width and adapted for reception of a single one of said items of merchandise, said member being rotatably mounted for vertical alignment of said recess with said annular wall opening;

said partitions being spaced sufficiently one from the other to contain a plurality of said items of merchandise loosely disposed side-by-side therebetween; and protuberances on the inner surfaces of said annular wall adjacent said opening on opposite sides thereof, sloped toward said vertical alignment to serve as ramps for directing any item of merchandise loosely contained in said bottommost bin toward the gravitational center of said bottommost bin, said partitions being formed to clear said protuberances during said rotation.

7. A vending machine, comprising:
a housing;
a merchandise storage member mounted for rotation in said housing on a horizontal axis, comprising a hub and a plurality of partitions radially extending from said hub;

an annular wall around the outer periphery of said partitions defining therewith a plurality of storage bins for containing items of merchandise, and defining an opening for the bottommost of said bins;

means for dispensing merchandise from said bottommost bin, comprising a selector member having an outer surface formed with a recess of predetermined width and adapted for reception of a single one of said items of merchandise, said member being rotatably mounted for vertical alignment of said recess with said annular wall opening;

said partitions being spaced sufficiently one from the other to contain a plurality of said items of merchandise loosely disposed side-by-side therebetween; and at least one protuberance on the outer surface of said dispensing means member for leading said recess and protruding through said annular wall opening during rotation of said member whereby to agitate items of merchandise in said bottommost bin, the edges of said annular wall adjacent said opening being slotted to permit passage thereby of said protuberance.

* * * * *